June 17, 1941.  E. L. McWHIRTER  2,245,803
FERTILIZER DISTRIBUTOR
Filed Oct. 26, 1939  2 Sheets-Sheet 2
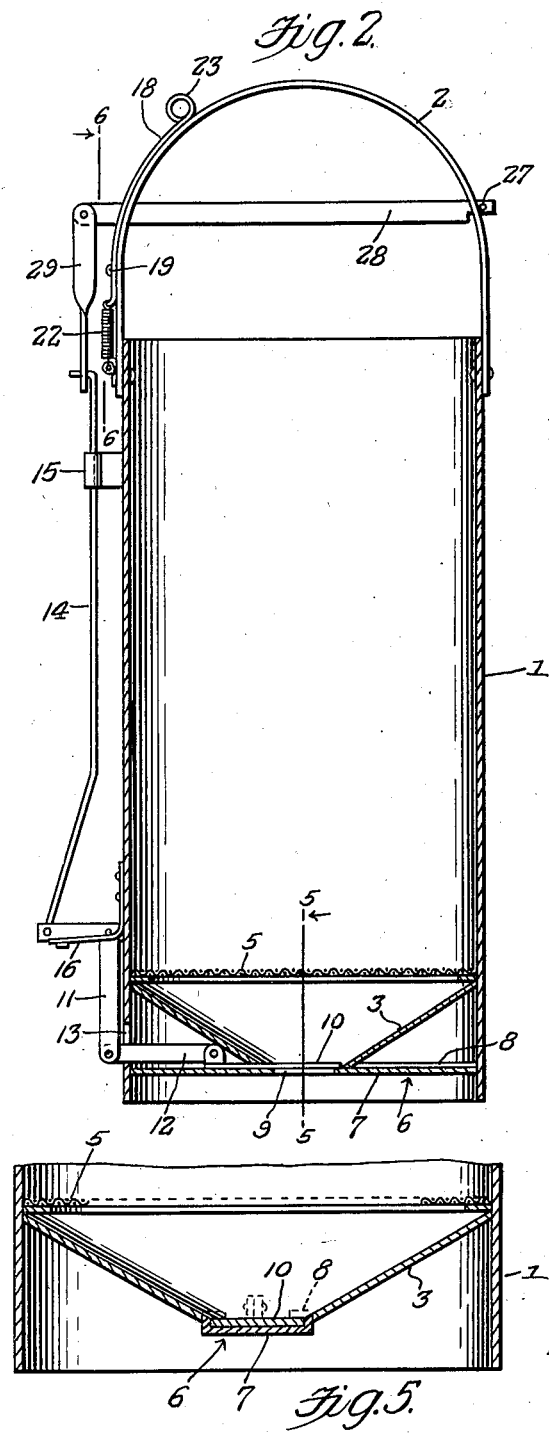
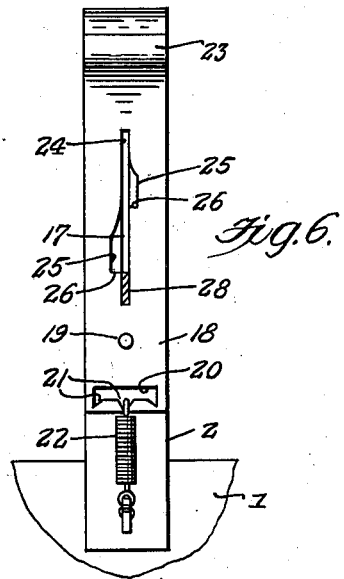
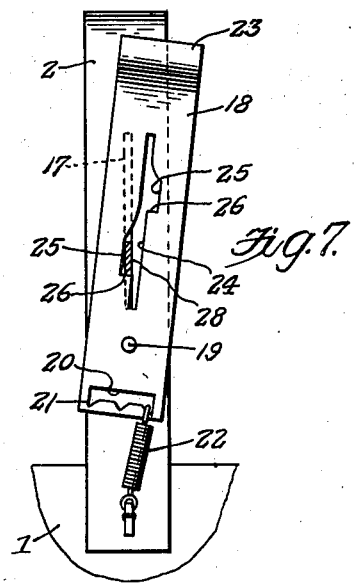
Inventor
Enoch L. McWhirter,
By Clarence A. O'Brien
and Hyman Berman
Attorneys Patented June 17, 1941

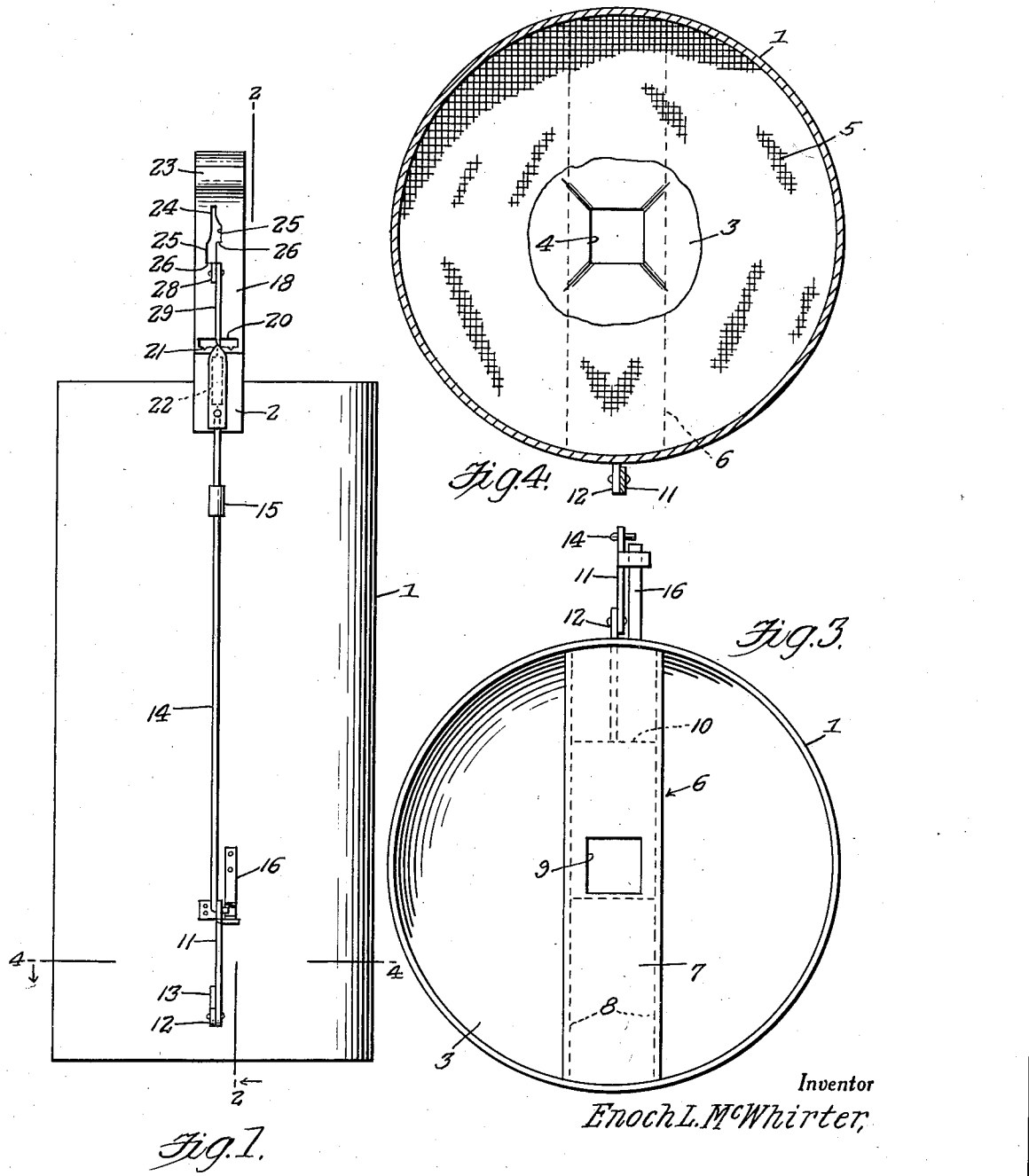

2,245,803

UNITED STATES PATENT OFFICE 2,245,803

FERTILIZER DISTRIBUTOR

Enoch L. McWhirter, Pontotoc, Miss.

Application October 26, 1939, Serial No. 301,486

2 Claims. (Cl. 221—119)

The present invention relates to new and useful improvements in distributors for pulverized fertilizer and has for one of its important objects to provide, in a manner as hereinafter set forth, a device of this character which is adapted to be conveniently carried and operated in one hand.

Another very important object of the invention is to provide a distributor of the aforementioned character comprising novel means for controlling or regulating the discharge of the pulverized fertilizer.

Other objects of the invention are to provide a pulverized fertilizer distributor of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in front elevation of a pulverized fertilizer distributor constructed in accordance with the present invention.

Figure 2 is a vertical sectional view through the device, taken substantially on the line 2—2 of Fig. 1.

Figure 3 is a bottom plan view.

Figure 4 is a view in horizontal section, taken substantially on the line 4—4 of Fig. 1, the central portion of the screen being broken out.

Figure 5 is a view in vertical section through the lower portion of the device, taken substantially on the line 5—5 of Fig. 2.

Figure 6 is a vertical sectional view through an upper portion of the distributor, taken substantially on the line 6—6 of Fig. 2.

Figure 7 is a view substantially similar to Fig. 6 but showing the valve operating lever in partially raised position.

Referring now to the drawings in detail, it will be seen that the embodiment of the invention which has been illustrated comprises a cylindrical container 1 of suitable material, preferably metal, for the reception of pulverized fertilizer, said container being of any desired capacity. Pivotally mounted on the upper portion of the container 1 is a bail 2 which is formed from a flat metallic strap. As best seen in Fig. 2 of the drawings, the container 1 includes a hopper type bottom 3 in the lower portion of which is a discharge opening 4 (see Fig. 4). A screen 5 is provided in the lower portion of the container 1.

Mounted diametrically in the lower end portion of the container 1, beneath the bottom 3 thereof, is a valve guide which is designated generally by the reference numeral 6. The guide 6 is in the form of a metallic bar 7 having inturned flanges 8 on its longitudinal edges. The bar 7 has formed therein an opening 9 which communicates with the container 1 through the opening 4 in the bottom 3. Slidably mounted in the guide 6 is a valve 10 which controls the discharge of the fertilizer through the opening 9.

Pivotally mounted on the lower portion of the container 1 is a bell crank lever 11. A link 12 connects the slidable valve 10 to one end portion of the bell crank lever 11 for actuation thereby. The link 12 is operable in a vertical slot 13 which is provided therefor in the lower portion of the container 1. A vertical operating rod 14 is pivotally connected, at its lower end, to the other end portion of the bell crank lever 11. The upper portion of the rod 14 is operable in a guide 15 which is provided therefor on the upper portion of the container 1. A spring 16 is engaged with the bell crank lever 11 for actuating same in a direction to close the slidable control valve 10.

The bail 2 has formed in one end portion a slot 17. Pivotally mounted on this end portion of the bail 2 is a latch 18. It will be observed that the pivot 19 is at an intermediate point in the latch 18. The lower end portion of the latch 18 has formed transversely therein a slot 20. The lower wall of the transverse slot 20 has formed therein a plurality of spaced notches 21. The reference numeral 22 designates a coil spring for yieldingly retaining the latch 18 in adjusted or set position, one end of said coil spring being anchored to the bail 2. The other end of the coil spring 22 is connected to the adjacent end of the latch 18 for transverse sliding movement in the slot 20 and is engageable selectively in the notches 21. At its upper end the latch 18 is rolled in a manner to provide a handle 23. It will be observed that the latch 18 is curved to conform to the bail 2. It will also be noted that the latch 18 is formed from a flat metal strap.

The latch 18 has formed therein a slot 24 which communicates with the slot 17. On opposite sides, and at spaced points, the walls of the slot 24 are recessed, as at 25, in a manner to provide shoulders 26.

Traversing the bail 2 and having one end pivotally connected thereto, as at 27, is a valve operating lever 28. The other end portion of the lever 28 projects through the communicating slots 17 and 24 and is operable therein. A twisted link 29 operatively connects the free end of the lever 28 to the upper end of the rod 14.

It is thought that the operation of the device will be readily apparent from a consideration of the foregoing. Briefly, with the lever 28 in lowered position, as seen in Figs. 2 and 6 of the drawings, the slidable valve 10 is closed. When it is desired to partially open and secure the valve 10 the lever 28 is swung upwardly to the position illustrated in Fig. 7 of the drawings. The latch 18 is then swung on its pivot 19 for engaging the lowermost shoulder 26 beneath the lever 28, the lowermost recess 25 accommodating said lever. When it is desired to secure the valve 10 in fully open position the lever 28 is swung upwardly until the uppermost shoulder 26 may be engaged therebeneath by swinging the latch 18 in the opposite direction or from right to left as viewed in Fig. 7 of the drawings. When the latch 18 is swung to a neutral or inoperative position parallel with the bail 2 the shoulders 26 are disengaged from beneath the lever 28 thus freeing said lever and permitting spring 16 to close the valve 10. With the latch 18 in neutral or inoperative position the slots 17 and 24 are in full registry with each other from end to end. The operator may now swing the lever 28 upwardly and downwardly to open and close the valve 10 as desired. By engaging the upper end of the coil spring 22 in the proper notch 21 the latch 18 may be yieldingly secured in any of its three positions.

It is believed that the many advantages of a pulverized fertilizer distributor constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A locking means for a fertilizer distributor of the type comprising a container having a discharge opening controlled by a valve, a slotted bail mounted on the container and a lever operable in the slotted bail and connected to the valve, including a latch pivotally mounted on the bail, said latch having a slot therein, the lever being operable in the latch slot, and shoulders at spaced points on the opposite longitudinal walls of the latch slot engageable selectively with the lever for securing said lever in adjusted position.

2. A locking means for a fertilizer distributor of the type comprising a container having a discharge opening controlled by a valve, a slotted bail mounted on the container and a lever operable in the slotted bail and connected to the valve, including a latch pivotally mounted, at an intermediate point, on the bail, said latch having a longitudinal slot in one end portion and a transverse slot in its other end portion, the transverse slot having spaced notches in one of the walls thereof, shoulders at spaced points on the opposite walls of the longitudinal slot engageable selectively with the lever for securing said lever in adjusted position, and a spring having one end adjustably connected to the latch and engageable selectively in the notches in the transverse slot for securing said latch in adjusted position.

ENOCH L. McWHIRTER.